(12) United States Patent
Seymour, II et al.

(10) Patent No.: US 6,374,805 B1
(45) Date of Patent: Apr. 23, 2002

(54) ACTUATING FLUID DELIVERY SYSTEM FOR A FUEL INJECTOR

(75) Inventors: Kenneth R. Seymour, II, Villa Park; Martin R. Zielke, Lockport; Edgardo Y. Estacio, Itasco, all of IL (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/653,051

(22) Filed: Sep. 1, 2000

Related U.S. Application Data

(60) Provisional application No. 60/153,396, filed on Sep. 10, 1999.

(51) Int. Cl.$^7$ ............................................... F02M 33/02
(52) U.S. Cl. ...................... 123/456; 123/468; 123/469; 123/470
(58) Field of Search ................. 123/456, 463, 123/469, 470; 285/144.1, 145.2, 145.3, 145.4, 146.1, 146.2, 272, 282, 298

(56) References Cited

U.S. PATENT DOCUMENTS

| | | | |
|---|---|---|---|
| 4,286,563 A | | 9/1981 | Magdi et al. |
| 4,295,452 A | | 10/1981 | Lembke et al. |
| 4,384,557 A | * | 5/1983 | Johnson ........................ 123/468 |
| 4,445,713 A | * | 5/1984 | Bruning ........................ 285/14 |
| 4,751,904 A | | 6/1988 | Hudson |
| 4,776,615 A | | 10/1988 | Young |
| 4,996,961 A | | 3/1991 | Usui |
| 4,996,962 A | | 3/1991 | Usui |
| 5,016,594 A | * | 5/1991 | Hafner et al. ................ 123/470 |
| 5,058,554 A | | 10/1991 | Takeda et al. |
| 5,121,731 A | * | 6/1992 | Jones .......................... 123/470 |
| 5,143,039 A | | 9/1992 | Gmelin |
| 5,211,149 A | | 5/1993 | DeGrace, Jr. |
| 5,273,015 A | | 12/1993 | Yonekawa et al. |
| 5,299,542 A | | 4/1994 | Hafner |
| 5,323,749 A | * | 6/1994 | Gras et al. ................... 123/470 |
| 5,372,113 A | | 12/1994 | Smith |
| 5,423,303 A | | 6/1995 | Bennett |
| 5,479,900 A | * | 1/1996 | Bodenhausen et al. ..... 123/470 |
| 5,531,202 A | | 7/1996 | Lorraine |
| 5,724,946 A | * | 3/1998 | Franchitto ................... 123/470 |
| 5,806,494 A | | 9/1998 | Glassey |
| 5,934,269 A | * | 8/1999 | Wilson ........................ 126/512 |

FOREIGN PATENT DOCUMENTS

| | | |
|---|---|---|
| DE | 19606946 A | 9/1997 |
| DE | 19734669 A | 9/1998 |
| DE | 19735665 A | 1/1999 |
| EP | 0829640 A | 3/1998 |
| GB | 2021720 A | 12/1979 |

* cited by examiner

*Primary Examiner*—Thomas N. Moulis
(74) *Attorney, Agent, or Firm*—Dennis Kelly Sullivan; Jeffrey P. Calfa; Gilberto Hernandez

(57) ABSTRACT

A fluid delivery system for delivering a supply of a fluid from a fluid source to at least one fuel injector includes a rail for conveying a fluid and being positionable proximate the fuel injector. The rail has a fluid passageway defined therein, the fluid passageway being in fluid communication with the source of fluid. A connector is in fluid communication with both the rail and with the fuel injector for fluidly connecting the rail to the fuel injector. The connector is universally shiftable in three orthogonal axes for accommodating static tolerances existing between the rail and the fuel injector and for accommodating dynamic relative motion between the rail and the fuel injector.

63 Claims, 8 Drawing Sheets

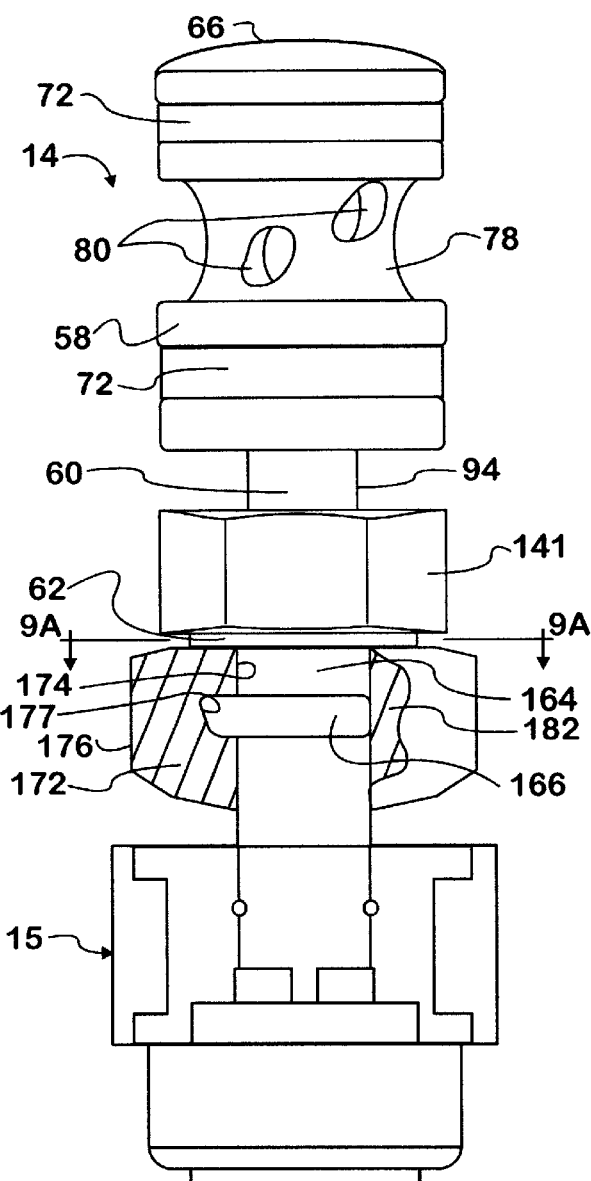
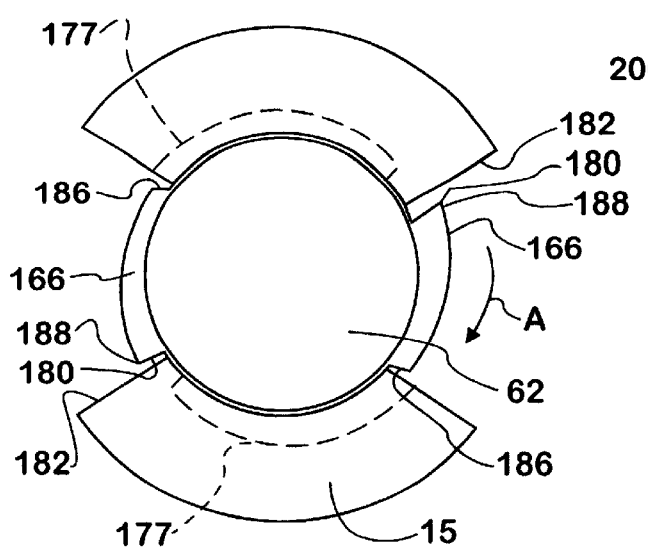
FIG. 9A
FIG. 9

ACTUATING FLUID DELIVERY SYSTEM FOR A FUEL INJECTOR

RELATED APPLICATIONS

The present application claims the benefit of U.S. Provisional Application Ser. No. 60/153,396, filed Sep. 10, 1999, incorporated herein in its entirety by reference.

TECHNICAL FIELD

The present invention concerns fluid rail assemblies for fuel injected internal combustion engines. More particularly, the present invention relates to a fluid rail assembly for use with a hydraulically actuated, electronically controlled fuel injector.

BACKGROUND OF THE INVENTION

Certain fuel injectors can be described as hydraulically actuated, electronically controlled. Hydraulic actuation of the fuel injector is preferably effected by engine oil at an elevated pressure. It should be understood that other fluids self contained in the vehicle powered by the internal combustion engine could also be used for hydraulic actuation of the fuel injector, including brake fluid, power steering fluid, or the like.

An exemplary fuel injector of this type is depicted generally in prior art FIG. 1 at 200. A hydraulically-actuated, electronically-controlled, unit injector (HEUI), of the type described in U.S. Pat. No. 5,181,494 and in SAE Technical Paper Series 930270, HEUI—*A New Direction for Diesel Engine Fuel Systems*, S. F. Glassey, at al, Mar. 1–5, 1993, which are incorporated herein by reference, is depicted in prior art FIG. 1. HEUI (injector) 200 consists of four main components: (1) control valve 202; (2) intensifier 204; (3) nozzle 206; and (4) injector housing 208.

The purpose of the control valve 202 is to initiate and end the injection process. Control valve 202 is comprised of a poppet valve 210, electric control 212, having an armature and solenoid. High pressure actuating oil is supplied to the valve's lower seat 214 through oil passageway 216. To begin injection, the solenoid of the electric control 212 is energized moving the poppet valve 210 upward the lower seat 214 to the upper seat 218. This action admits high pressure oil to the spring cavity 220 and the passage 222 to the intensifier 204. Injection continues until the solenoid of the electric control 212 is de-energized and the poppet 210 moves from the upper seat 218 to lower seat 214. Actuating oil and fuel pressure decrease as spent actuating oil is ejected from the injector 200 through the open upper seat oil discharge 224 to the valve cover area of the internal combustion engine, which is at ambient pressure.

The middle segment of the injector 200 consists of the hydraulic intensifier piston 236, the plunger 228, fuel chamber 230, and the plunger return spring 232.

Intensification of the fuel pressure to desired injection pressure levels is accomplished by the ratio of areas between the upper surface 234 of the intensifier piston 236 and the lower surface 238 of the plunger 228, typically about 7:1. The intensification ratio can be tailored to achieve desired injection characteristics. Fuel is admitted to chamber 230 through passageway 240 past check valve 242 from an external fuel supply.

Injection begins as high pressure actuating oil is supplied to the upper surface 234 of the intensifier piston 236 via passageway 222. As the piston 236 and the plunger 228 move downward, the pressure of the fuel in the chamber 230 below the plunger 228 rises. High pressure fuel then flows in passageway 244 past check valve 246 to act upward on needle valve surface 248. The upward force opens needle valve 250 and fuel is discharged from orifice 252 against the bias of return spring 256. The piston 236 continues to move downward until the solenoid of the electric control 212 is de-energized, causing the poppet valve 210 to return to the lower seat 214 under the force of spring 220, blocking oil flow. The plunger return spring 232 then returns the piston 236 and plunger 228 to their initial upward inactive positions, as depicted in FIG. 4. As the plunger 228 returns, the plunger 228 draws replenishing fuel into the fuel chamber 230 across ball check valve 242.

The nozzle 206 is typical of other diesel fuel system nozzles. The valve-closed-orifice style is shown, although a mini-sac version of the tip is also available. Fuel is supplied to the nozzle orifice 252 through internal passages. As fuel pressure increases, the nozzle needle 250 lifts from the lower seat 254 (as described above) allowing injection to occur. As fuel pressure decreases at the end of injection, the spring 256 returns the needle 250 to its closed position seated on the lower seat 254.

The fuel injector 200 uses the hydraulic energy of pressurized actuating fluid, in this case engine oil, to cause injection. The pressure of the incoming oil controls the downward speed of the intensifier piston 236 and plunger 228 movement, and therefore, the rate of fuel injection. The amount of fuel injected is determined by the duration of a signal keeping the solenoid of the electric control 212 energized. As long as the solenoid is energized and the poppet valve 210 is off its seat, the actuating fluid continues to push down the intensifier piston 236 and plunger 228 until the intensifier piston 236 reaches the bottom of its bore.

A similar hydraulically-actuated unit injector 200 is described in SAE paper No. 1999-01-0196, "Application of Digital Valve Technology to Diesel Fuel Injection" and U.S. Pat. No. 5,720,261. In this injector, the poppet control valve 202 of the HEUI injector 200 has been replaced by a spool type digital control valve which is controlled by two solenoid coils, the valve spool being the armature.

In either case, there is a need for delivery of the high pressure volume of actuating fluid to the fuel injector 200 in order to effect the fuel injection event as described above. Actuating fluid delivery must be accomplished while allowing for tolerance stack-ups and relative mechanical motion existing between the apparatus delivering the actuating fluid and the fuel injector 200. Tolerance stack-ups impose a considerable constraint on the design of any apparatus for delivering actuating fluid to a fuel injector 200. The injector 200, cylinder head, actuating fluid rail, and the connecting mechanism between the rail and the injector 200 all have tolerances associated with them. A desirable delivery mechanism is one that imposes no stress forces on the injector 200 as a result of the aforementioned tolerances and of the aforementioned relative motion. The delivery mechanism should additionally be easily connectable to the injector 200.

U.S. Pat. No. 4,996,962, issued Mar. 5, 1991, discloses a fuel delivery rail assembly. The '962 assembly uses sockets affixed to the tops of the fuel injectors. Plastic rail tubes extending between the sockets provide flexible engagements. The '962 patent asserts that with such flexible engagements there is no need of strict limitation about a dimensional accuracy or geometrical orientation of the parts. It should be noted that while it is claimed that the flexible plastic rail tubes solve some of the problems sought to be solved by the present invention, there is no structure or teaching in the '962 patent that relates to the present invention.

SUMMARY OF THE INVENTION

The actuating fluid delivery system of the present invention substantially meets the aforementioned needs of the industry. The connector assembly of the present invention that extends between the rail assembly and the fuel injector accommodates the aforementioned tolerances by being movable in three orthogonal dimensions. Further, after installation, relative motion existing between the rail assembly and the fuel injector is further accommodated by the ability of the connector assembly to accommodate such motion by being shiftable in the three dimensions. This is enabled by providing rotatability between the delivery system connector and the fuel injector. The ability of certain connector components to rotate relative to the fuel injector in at least a plane that is disposed orthogonal to a longitudinal axis enables both a shifting in the plane and a translation along the longitudinal axis. When rotation is able to occur, then the shifting and translation is able to occur. Additionally, the present invention provides for an exceedingly short path for the actuating fluid to travel from the rail assembly to the fuel injector. In the present invention, it is desirable that the $L/D^2$ ratio for the connector assembly be less than one. The present invention is less than 70 mm in length and satisfies the aforementioned $L/D^2$ ratio. Further, the connector assembly of the actuating fluid delivery system of the present invention is disposable in the limited space defined between the rocker arms of the head of the internal combustion engine.

The present invention includes several embodiments that provide for ease in connecting the connector assembly to the exemplary injector. An embodiment provides for a snap fit by pressing the connector onto a receiver assembly that is coupled to the injector. A further embodiment provides for a threaded engagement with the receiver assembly.

The present invention is a fluid delivery system for delivering a supply of a fluid from a fluid source to a fuel injector and includes a rail for conveying a fluid, the rail being positionable proximate the fuel injector. The rail has a fluid passageway defined therein, the fluid passageway being in fluid communication with the source of fluid. A connector is in fluid communication with both the rail and with the fuel injector for fluidly connecting the rail to the fuel injector. The connector is moveable in three orthogonally disposed axes for accommodating static tolerances existing between the rail and the fuel injector and for accommodating dynamic relative motion between the rail and the fuel injector such that stresses imposed on the fuel injector resulting from being fluidly connected to the rail are substantially eliminated.

BRIEF DESCRIPTION OF THE DRAWINGS

FIG. 9 is a side elevational view of an alternative embodiment of the connector assembly and receiver assembly with portions thereof broken away;

FIG. 9*a* is a downward planform view of the device of FIG. 9 taken at a horizontal section line 9*a*—9*a*;

DETAILED DESCRIPTION OF THE PREFERRED EMBODIMENT

Figure 1:
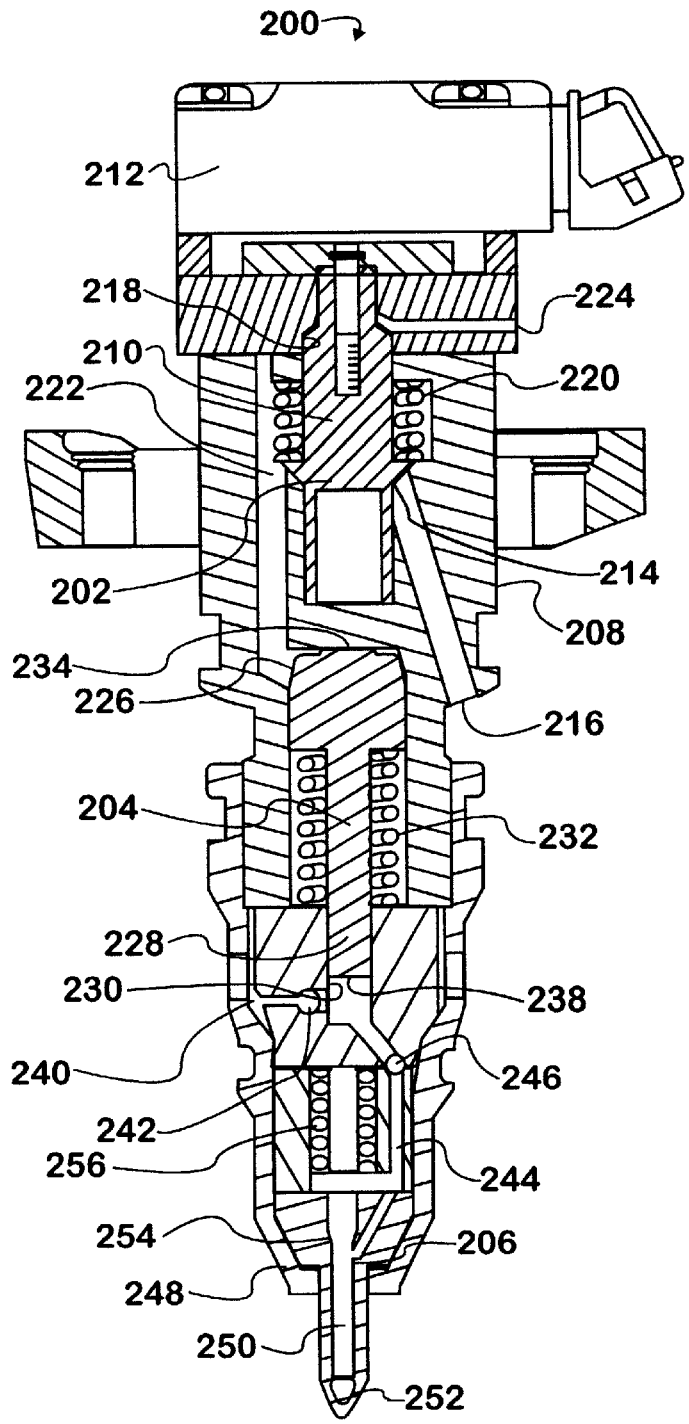
FIG. 1 is a sectional view of an exemplary prior art fuel injector.
Figure 2:
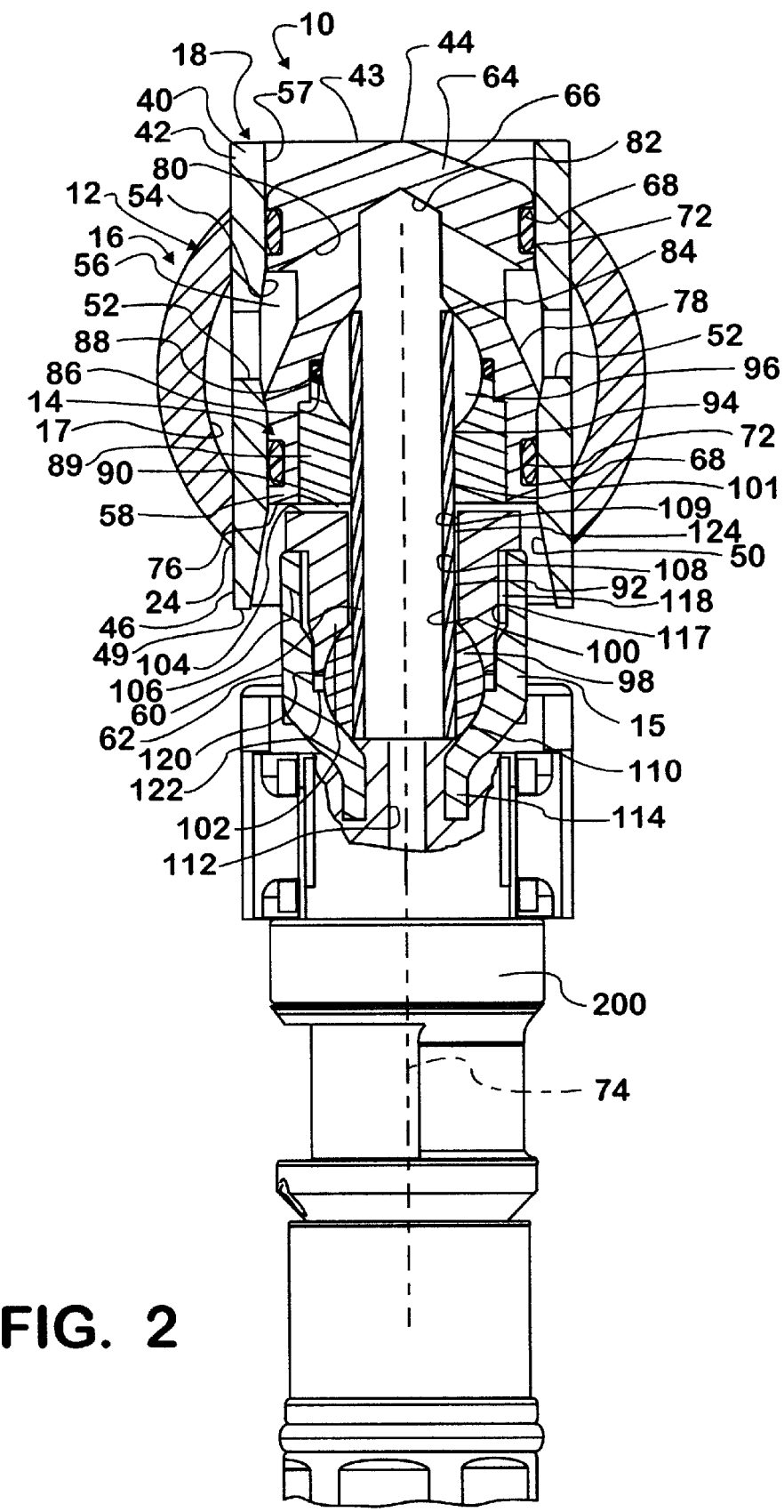
FIG. 2 is a sectional view of the connection assembly of the actuating fluid delivery system of the present invention viewed along the axis of the rail assembly.

The actuating fluid delivery system of the present invention is shown generally at 10 in the figures. In FIG. 2, the actuating fluid delivery system 10 is depicted coupled to an exemplary fuel injector 200 of the types described above with reference to the prior art. It is understood that the fuel injectors 200 are exemplary only and other hydraulically-actuated fuel injectors may be utilized with the actuating fluid delivery system 10.

Figure 5:
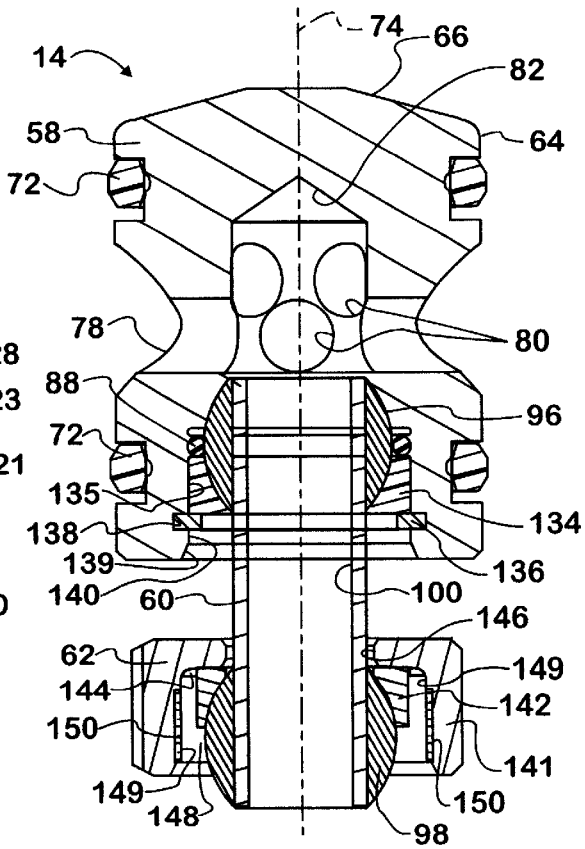
FIG. 5 is a sectional view of the connector assembly of FIG. 3.

The actuating fluid delivery system 10 has two major components: rail assembly 12 and connector assembly 14. Delivery system 10 may be directly coupled to the injector 200 or may be coupled to the injector 10 by means of a receiver assembly 15, as depicted in FIGS. 2 and 5, that mounts on the injector 200.

The rail assembly 12 includes two major subcomponents, an elongate rail 16 and cross-drilled sleeve 18. The elongate rail 16 is preferably positioned immediately above a row of fuel injectors disposed in an engine cylinder head and has a fluid passageway 17 defined therein. For an in-line engine, a single rail assembly 12 is positioned above the row of fuel injectors with a connector assembly 14 connecting the elongate rail 16 to each of the fuel injectors 200, e.g., six connector assemblies 14, for an inline six engine. For a V-configuration engine, a pair of rail assemblies 12 respectively service each of the two banks of cylinders, e.g., two rail assemblies 12 each with four connector assemblies 14 for a V8 engine. Each of the elongate rails 16 is fluidly coupled to a source of high pressure actuating fluid which is preferably engine lubricating oil and may reach pressures on the order of 3500 psi.

A pair of relatively large bores 22, 24 are defined in the elongate rail 16 proximate each of the fuel injectors to be serviced. Each of the bores 22, 24 are in registry along an axis (longitudinal axis 74) that is preferably transverse to the longitudinal axis of the elongate rail 16. The elongate rail 16 may be fixedly coupled to the cylinder head of the engine or to a rail carrier attached thereto by a plurality of straps that are fastened to the cylinder head or carrier as by bolts or studs.

The cross-drilled sleeve 18 of the rail assembly 12 of the actuating fluid delivery system 10 is comprised of a sleeve cylinder 40. The sleeve cylinder 40 is closely received within the bores 22, 24 of the rail assembly 12. Sleeve cylinder 40 has an upper projection 42. A plane defined by the upper margin 43 of the upper projection 42 is preferably tangential with the exterior surface of the elongate rail 16, thereby defining a flush fitting 44 at the point of tangency. The intersection of the sleeve cylinder 40 with the bore 22 is preferably welded or brazed to define a fluid tight intersection between the sleeve cylinder 40 and the bore 22 of the elongate rail 16.

The sleeve cylinder 40 has an opposed lower projection 46 that is similar in construction to the upper projection 42 described above. The intersection of the lower projection 46 with the bore 24 is preferably welded to define a fluid tight intersection. The lower projection 46 forms a flush fitting at the point of tangency of the lower margin 49 of the lower projection 46 with the exterior surface of the elongate rail 16. Accordingly, the longitudinal dimension of the sleeve cylinder 40 is substantially equal to the exterior diameter of the elongate rail 16.

The sleeve cylinder 40 has a cylindrical bore 57 defined through the wall of the cylinder 40. The cylindrical bore 57 presents an inwardly directed, decreasing diameter, beveled surface 50 extending upward from the lower margin 49. The sleeve cylinder 40 has a plurality of cross drilled bores 52 preferably equi-angularly spaced around the circumference of the sleeve cylinder 40. In the sectional depiction of FIG. 2, two opposed cross drilled bores 52 of the plurality of bores 52 are depicted. The bores 52 are in fluid communication with the fluid passageway 17. The cylindrical bore 57 presents an undercut surface 54 proximate the cross drilled bores 52. The undercut surface 54 defines in-part an annular fluid passageway 56. This annular fluid passageway 56 is in fluid communication with the fluid passageway 17 via the bores 52.

The connector assembly 14 of the actuating fluid delivery system 10 includes three major subcomponents: upper collar 58, central tube 60, and lower collar 62.

The upper collar 58 of the connector assembly 14 includes a collar body 64. The collar body 64 has a domed top surface 66. An annular groove 68 is defined proximate the domed top surface 66. A ring seal 72 is disposed within the annular groove 68 to define a fluid tight seal between the collar body 64 and the cylinder bore 57 of the sleeve 18. The collar body 64 has a longitudinal Z axis that is coincident with Z axis (longitudinal axis) 74 and that further is coincident with the longitudinal axis of the sleeve cylinder 40. The collar body 64 of the upper collar 58 presents a generally flat bottom face 76. It should be noted that the bottom face 76 is preferably spaced apart from the lower collar 62 to accommodate relative motion between upper collar 58 and lower collar 62 along the Z axis 74.

An annulus 78 is defined around the collar body 64. The annulus 78, in cooperation with the undercut 74 defined in the cylinder bore 57 of the sleeve cylinder 40, defines the annular fluid passageway 56. A plurality of connecting bores 80 extend inward from the annular fluid passageway 56. Two opposed connecting bores 80 of the plurality of connecting bores 80 are depicted in FIG. 2. The connecting bores 80 are fluidly coupled to an axial bore 82 defined along the Z axis 74 of the collar body 64. The axial bore 82 has a generally semi-spherical bore expansion comprising a socket 84. Socket 84 is spherical except at the points of intersection with the axial bore 82. A circumferential groove is partially defined by a shelf 86 in the socket 84 at the point of its greatest circumference and by an upper ferrule 89 which is press fit into the collar body 64 and which defines the remainder or lower portion of the socket 84. A ring seal 88 is disposed within the groove so defined to effect a fluid tight seal between the upper collar 58 and the central tube 60. An opening 90 is defined in the flat bottom face 76 of the upper ferrule 89. The opening 90 opens to the axial bore 82.

The central tube 60 of the connector assembly 14 includes a tube body 92. The tube body 92 has a tubular center portion 94, an upper spherical end, comprising a ball 96, and a lower spherical end, comprising a ball 98. The balls 96, 98 may be formed integral with the tubular center portion 94, as depicted in FIG. 2, or separately, as depicted in FIG. 5. Further, the tube center portion 94 may function adequately to minimize static and dynamic stresses with only a single ball and socket, such as ball 96 and socket 84, in cooperation with another suitable coupling (not shown) to the injector 200, such as a ferrule in compressive sealing engagement with tube 94. An axial bore 100 is defined along the Z axis 74. The axial bore 100 is fluidly connected to the upper portion of the axial bore 82 defined in the collar body 64.

In assembly, the upper ball 96 of the tube body 92 is placed into the socket 84 of the collar body 64, the ring seal 88 is installed in the socket and the upper ferrule 89 is press fit to retain the upper ball 96 in the collar body 64. The bore 90 in the upper ferrule 89 is somewhat greater in diameter than the exterior diameter of the tubular center portion 94 of the tube body 92 to define a gap 101 therebetween. The gap 101 accommodates relative motion in the X, Y planes (the X, Y planes being disposed orthogonal both to themselves and to Z axis 74) between the upper collar 58 and the tube 60.

The lower collar 62 of the connector assembly 14 includes a lower ferrule 102. The ferrule 102 has a generally flat top surface 104. As previously indicated, the flat top surface 104 is spaced apart from the flat bottom face 76 of the collar body 64. As will be seen, such spacing accommodates in part relative motion between the fuel injector 200 and the actuating fluid delivery system 10.

An opening 106 defined in the flat top face 104 opens to an axial bore 108 defined in the lower ferrule 102. The axial bore 108 is preferably coaxial with the Z axis 74. The axial bore 108 has an upper portion 109 that expands downwardly into socket 110. The receiver 15 necks down and is provided with external threads at its lower end for threaded securement in a threaded bore 114 in the injector body 200. The injector 200 has a relatively slender fluid passageway 112 defined in the receiver assembly 15 which effectively comprises a portion of the axial bore 108 extends downward from the socket 110 to fluidly couple the connector assembly 14 of the actuating fluid delivery system 10 to the fuel injector 200. The receiver assembly 15 has an upwardly directed aperture 117, the aperture 117 being designed to receive the ball 98 and the lower ferrule 102 therein. The lower ferrule 102 is threadedly engageable with the receiver assembly 15 by threads 118 formed in the lower exterior margin of the lower ferrule 102. An annular groove 120 is defined between the lower ferrule 102 and the receiver assembly 15 at the point of the greater circumference of socket 110. A ring seal 122 is disposed within the annular groove 120, thereby creating a fluid tight seal between the lower ferrule 102, the receiver assembly 15, and the exterior surface of the ball 98 of the tube 60.

The diameter of the upper portion 109 of the axial bore 108 is somewhat greater than the diameter of the exterior surface of the center portion 94 of the tube 60, thus generating a gap 124 between the lower collar 62 and the tube 60. The gap 124 accommodate relative motion in the X, Y plane between the lower collar 62 and the tube 60.

The connector assembly 14 is assembled by pressing the upper ball 96 of the tube 60 into the socket 84 of the upper collar 58 and pressing the lower ball 98 of the tube 60 into the socket 110 of the lower collar 62. The balls 96, 98 are free to rotate within the respective sockets 84, 110. The connector assembly 14 may then be fixedly, sealingly joined to the fuel injector 200 by threading the lower collar 62 by means of threads 118 into receiver assembly 15, coupled to the fuel injector 200.

The rail assembly 12 is then joined to the connector assembly 14. This is accomplished by inserting the upper collar 58 into the cylindrical bore 57 of the cross drilled sleeve 18. Initial passage of the upper collar 58 into bore 57 is directed and centered by the beveled surface 50. When the rail assembly 12 is in place, suitable clamps are secured to the head of the engine. The upper collar 58 is slidable within the cylindrical bore 57 after assembly and while the delivery system 10 is coupled to the injector 200 in order to accommodate static tolerance stack-up between the actuating fluid delivery system 10 and injector 200 in the dimension of the Z axis 74.

In this static relationship of the actuating fluid delivery system 10 to the injector 200, substantially no stress is imposed on the injector 200 as a result of the aforementioned slidability in the Z dimension 74 and additionally as a result of the ability of the upper collar 58 and the lower collar 62 to shift in the X, Y plane relative to the tube 60, providing for three dimensional shiftability. Such shifting in the X, Y plane is effectively a ball and socket type shifting resulting from the rotational motion of the ball 96 of the tube body 92 within the substantially spherical socket 84 of the upper collar and the rotation of the ball 98 of the tube body 92 within the substantially spherical socket 110 of the lower collar 62. The upper collar 58 is at all times free to translate in the Z axis 74 with respect to the cross drilled sleeve 18 in order to eliminate any potential stress in the Z axis 74. Accordingly, the delivery system 10 has three dimensional degrees of freedom of motion, as well as three rotational degrees of freedom of motion, when coupled to the injector 200. Such freedom of motion in both static and dynamic conditions is achieved as well as when only an upper ball 96 disposed in a socket 84 is utilized in conjunction with Z axis 74 translation.

Subsequent dynamic motion of the actuating fluid delivery system 10 with respect to the fuel injector 200 maybe caused, for example, by the vibration of engine operation and by expansion and contraction of the various components due to heating and cooling and the like. The dynamic motion is similarly accounted for in the X, Y and Z axes as previously described with reference to the static tolerance stack-up. Relative motion of the actuating fluid delivery system 10 with respect to the injector 200 is accommodated by freedom to move enough in the X, Y, and Z axes to accommodate substantially all of the dynamic motion that occurs between the delivery system 10 and the injector 200 during operation of the engine. This is enabled by providing rotatability between the delivery system connector and the fuel injector. The ability of certain connector components (as noted above) to rotate relative to the fuel injector in at least a plane that is disposed orthogonal to a longitudinal axis enables both a shifting in the plane and a translation along the longitudinal axis. When rotation is able to occur, then the shifting and translation is able to occur. Accordingly, in both a static situation and a dynamic situation, virtually no stresses are imposed on the fuel injector 200 by the delivery system 10 as a result of the ability of the connector assembly 14 to move three dimensionally in the X, Y and Z axes.

During fuel injection, for delivery of an actuating fluid to the fuel injector 200, high pressure fluid flows from the source of high pressure fluid 20 through the elongate rail 16. Fluid passes through the cross drilled bores 52 of the cross drilled sleeve 18 into the annular fluid passageway 56. The annular fluid passageway is fluidly connected to the connecting bores 80. Fluid flows through the connecting bores 80 to the axial bore 82 of the upper collar 58. The actuating fluid then flows through the axial bore 100 of the tube body 92 to the fluid passageway 112 defined in the lower collar 62. The actuating fluid then flows to the fuel injector 200 for controlling the injection event as described above in relation to the prior art.

Figure 3:
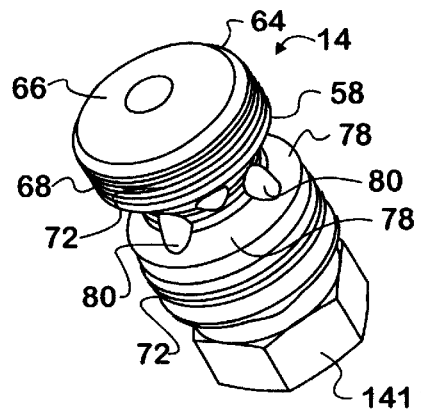
FIG. 3 is a perspective view of an alternative embodiment of the connector assembly of the present invention.
Figure 4:
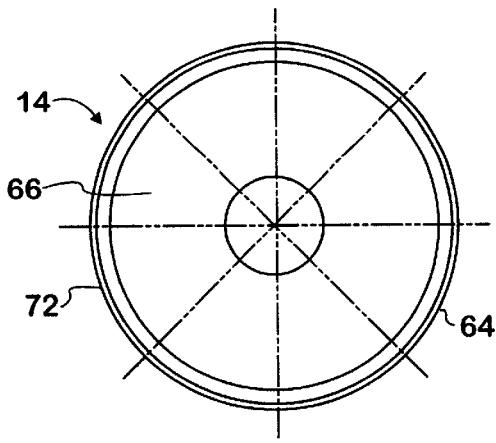
FIG. 4 is a top view of the connector assembly of FIG. 3.

Referring to FIGS. 3–5, an alternative preferred embodiment of the connector assembly 14 is depicted wherein like reference numbers denote like components. It is understood that connector assembly 14 is to be slidably engaged with an elongate rail 16 substantially as described with respect to FIG. 2. The connector assembly 14 of FIGS. 3–5 differs in several features with respect to the connector assembly 14 of FIG. 2. The embodiment of FIGS. 3–5 includes an upper ferrule 134 disposed in an aperture defined between the upper spherical end 96 and the inner margin 135 of the slider collar 58. The upper margin of the ferrule 134 bears on the ring seal 88, holding the ring seal 88 in place to establish a fluid tight seal between the upper spherical end 96 and the inner margin 135 of the slider collar 58.

The upper ferrule 134 is held in place by a snap ring 136 and is disposed generally circumferential to the tube 60 in an annular groove 138 defined in the inner margin 135 of the slider collar 58. The snap ring 136 is radially compressible so that the snap ring 136 may be inserted into the entry aperture 140 defined at the lower margin of the slider collar 58. The snap ring 136 is radially compressed by forcing the snap ring 136 upward through the chamfered mouth 139 to the entry aperture 140. The entry aperture 140 is generally concentric with the tube 60. The snap ring 136 is released from radial compression after passing through the entry aperture 140. Such release causes the snap ring 136 to expand into the groove 138, thereby holding the snap ring 136 in place.

The connector assembly 14 of FIGS. 3–5 further includes a lock nut 141. A lower ferrule 142 is disposed generally concentric with the tube 60 and abutting an interior underside margin 144 of the lock nut 141. The lock nut 141 has a bore 146 defined therein. The bore 146 is in sliding engagement with the exterior surface of the tube 60. In the embodiment of FIGS. 3–5, the lower spherical end 98 is formed separate from the tube 60, such that the lock nut 141 and lower ferrule 142 are slid up over the exterior surface of the tube 60 prior to the lower spherical end 98 being slid onto the exterior surface of the tube 60. A generally L-shaped receiver aperture 148 is defined between respective portions of the exterior surface of the lower spherical end 98, the exterior margin of the lower ferrule 142, and the inner margin 149 of the lock nut 141. Receiver threads 150 are defined over a portion of the inner margin 149 of the lock nut 141.

Figure 6:
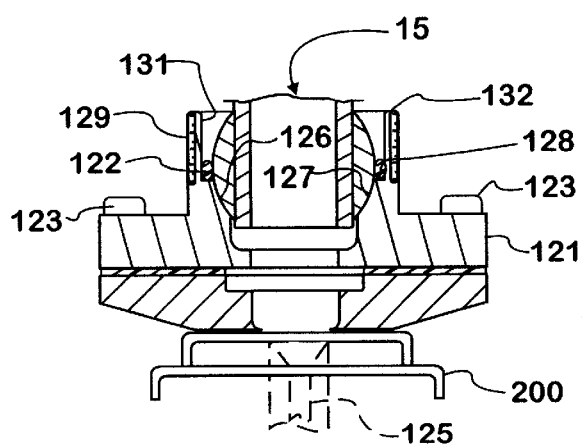
FIG. 6 is a sectional view of a receiver assembly coupled to a fuel injection and adapted to receive the connector assembly depicted in FIGS. 3–5.

Referring to FIG. 6, the receiver 15 has a receiver body 121. The receiver body 121 is fixedly coupled to the exemplary fuel injector 200 by a plurality of cap screws, two cap screws 123 being depicted in FIG. 6. A centrally defined actuating fluid passageway 125 extends through the receiver body 121 and into the fuel injector 200. The actuating fluid passageway 125 is fluidly coupled to the axial fluid bore 100 defined in the tube 60. The actuating fluid passageway 125 comprises the final fluid coupling between the actuating fluid delivery system 10 of the present invention and the fuel injector 200.

A generally funnel shaped ball receiver 126 is defined interior to the receiver body 121. The ball receiver 126 has a generally spherical face 127 for receiving the lower spherical ball end 98 therein. A radially outward step 128 is provided at the upper margin of the spherical face 127 to partially define a groove to receive a seal ring 122 upon assembly. The exterior surface of the receiver body 121 has a plurality of threads 129 defined therein.

As can be seen in reference to FIGS. 5 and 6, in assembly, the receiver threads 150 of the lock nut 141 are threadedly engaged with the threads 129 of the receiver assembly 15. The upper portion of the receiver assembly 15 projects into and substantially fills the receiver aperture 148. As the lock nut 141 is turned down onto the receiver assembly 15, the lower ferrule 142 extends in relatively close fit inside the inner margin 131 of the receiver body 121, until the interior underside margin 144 of the lock nut 141 contacts the nut stop end surface 132 of the receiver body 121, thus compressing the seal ring 122 between the ferrule 142, the shelf 128 of the receiver body 121, and the exterior surface of the lower spherical end 98 to create a fluid tight seal.

Figure 7:
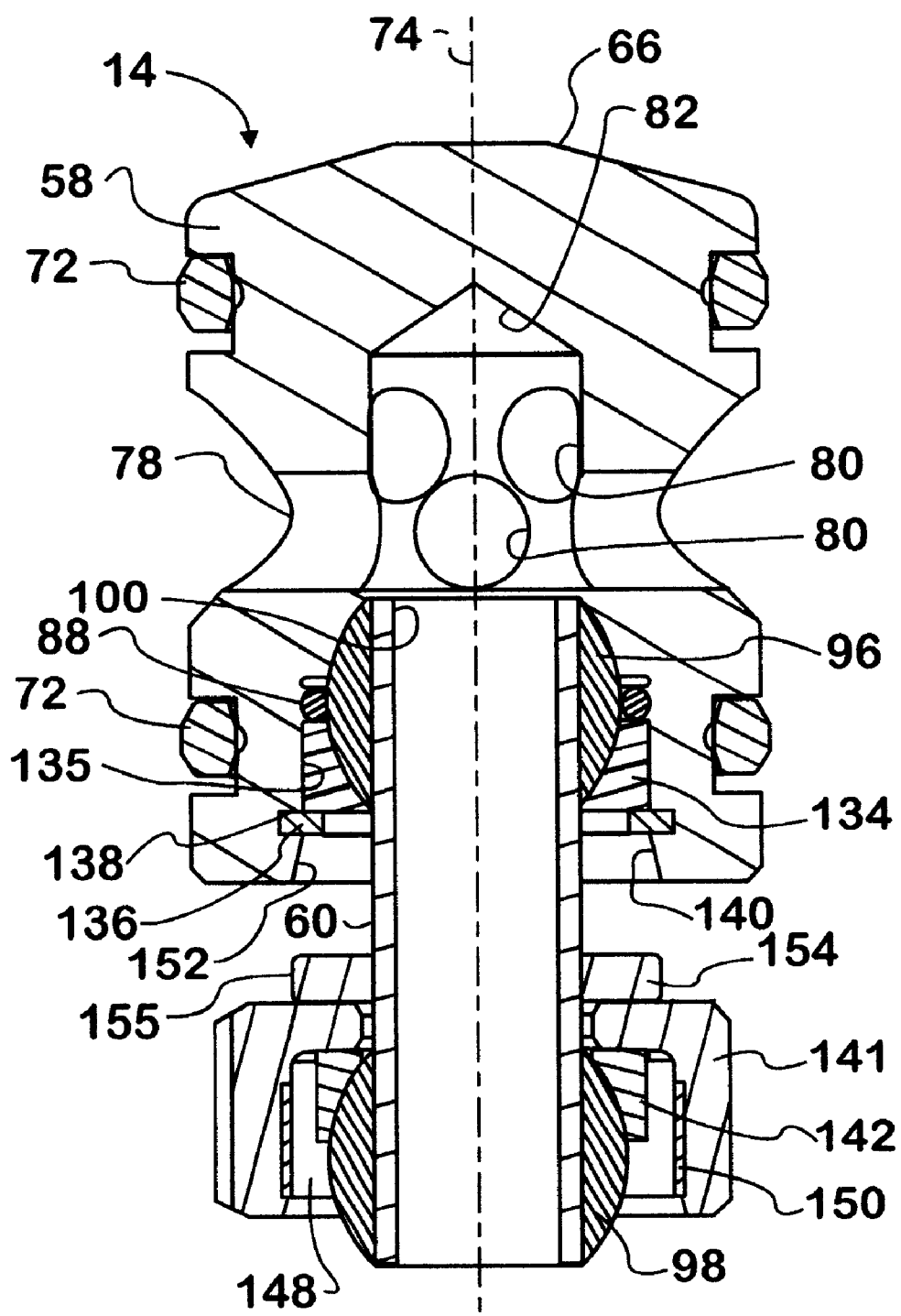
FIG. 7 is an alternate embodiment of the connector assembly depicted in FIGS. 3–5.

FIG. 7 is a variation on the previously described embodiment of the actuating fluid delivery system 10 of FIGS. 3–5. In the embodiment of FIG. 7, the entry aperture 140 defined in the slider collar 58 is chamfered to present a chamfered entry aperture 152. The lock nut 141 includes a generally circular standoff 154 formed integral with the lock nut 141 and presented on the upper margin thereof. The circumference of the outer margin 155 of the standoff 154 is slightly less than the minimum inside circumference of the chamfered entry aperture 152. In assembly, the snap ring 135 is positioned around the tube 60. The lock nut 141 is slid upward on the tube 60, engaging the underside of the snap ring 136. The circumferential margin of the snap ring 136 bears on the chamfered entry aperture 152. As the lock nut 141 continues its upward travel, the snap ring 136 is radially compressed by the chamfered entry aperture 142. The standoff 154 has a height dimension that is great enough to force the snap ring 136 above the chamfered entry aperture 152. When the radially compressed snap to ring 136 clears the chamfered entry aperture 152, a snap ring 136 expands into the groove 138. The standoff 134 of the lock nut 141 in combination with the chamfered entry aperture 152 greatly simplifies the process of positioning the snap ring 136 within the groove 138.

Figure 8:
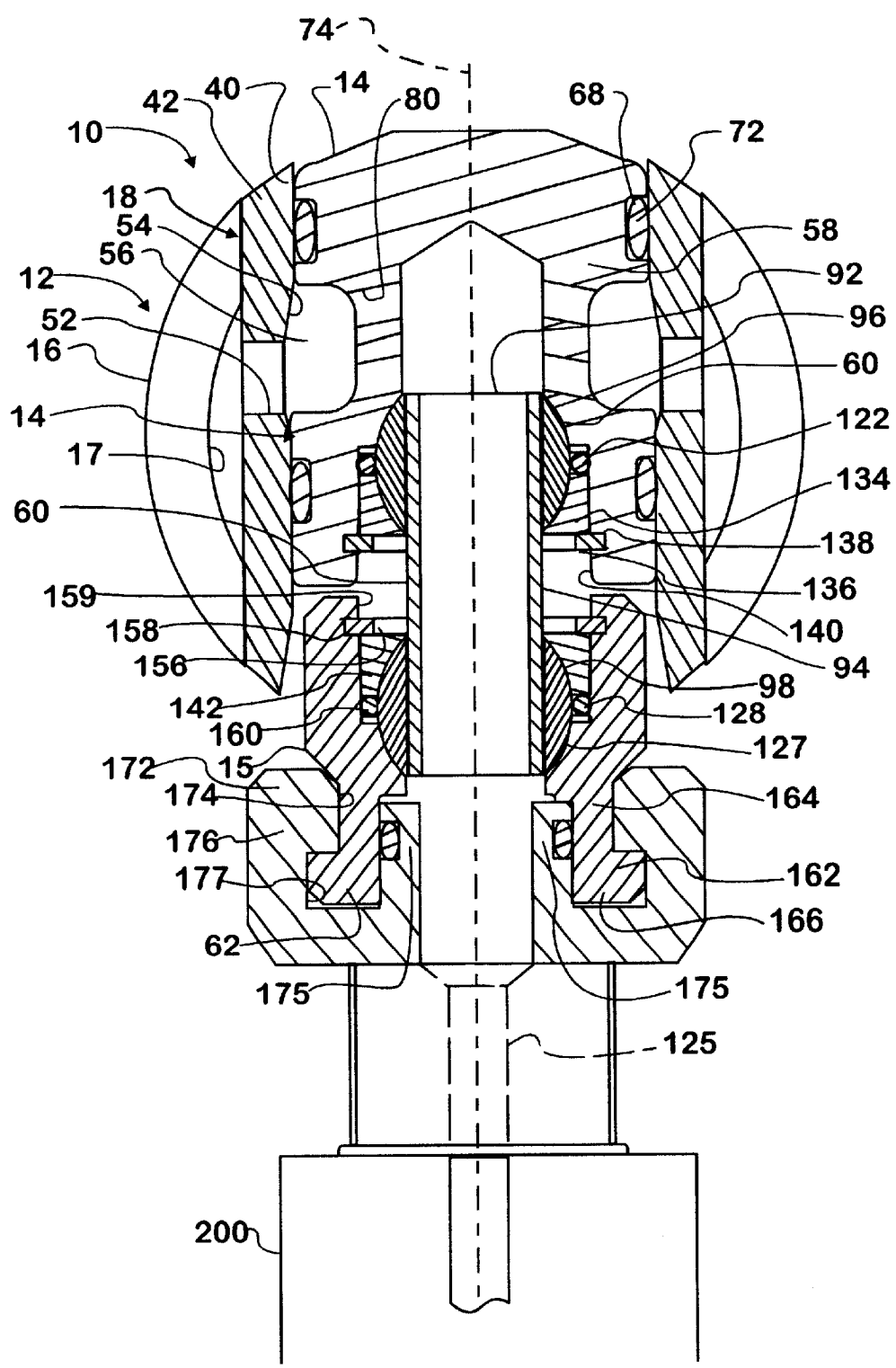
FIG. 8 is an alternative embodiment of the actuating fluid delivery system of the present invention, the view taken end on with respect to the rail assembly.

A further preferred embodiment of the actuating fluid delivery system 10 is presented in FIG. 8. The embodiment of FIG. 8 is what may be termed a claw lock connector. The lower collar 62 of the connector assembly 14 and the receiver assembly 15 each have features not found in the previously described embodiments. With respect to the lower collar 62, a snap ring 156 is disposed in a groove 158 defined in the inner margin 159 of the lower collar 62. The snap ring 156 holds a lower ferrule 152 in compressive engagement with an O-ring 160 and with the exterior margin of the lower spherical end 98 to effect a fluid tight seal between the lower collar 62 and the lower spherical end 98. The lower portion of the lower collar 62, as depicted in FIG. 8, defines a claw lock connector 162. The claw lock connector 162 has a relatively slender neck 164 that expands radially outwardly into the integrally-formed claw 166. The neck 164 and the claw 166 are designed to mate with the receiver assembly 15.

The receiver assembly 15 of the embodiment depicted in FIG. 8 has an upper portion configured to function as a claw receiver 172. The claw receiver 172 has an entry aperture 174 that is generally concentric with the tube 60 and spaced apart therefrom. The entry aperture 174 is defined between an upwardly extending inner projection 175 and an upwardly extending outer projection 176. The entry aperture 174 is sized to accommodate the neck 164 of the connector 162. The entry aperture 174 expands into a claw groove 177 at the lower margin of the entry aperture 174. The claw groove 177 has an expanded diameter as compared to the entry aperture 174 and is designed to accommodate the claw lock connector 162 of the lower collar 62.

The claw 166 does not define a full circumferential circular shape, but is in effect two semicircular, helical threads. In assembly, lower collar 62 is slid over the inner projection 175. The lower collar 62 is then rotated approximately ¼ of a turn through which the helical shaped claws 166 engage and substantially fill the two semicircular claw grooves 177. This means of compressive rotational engagement of the semicircular claws 166 with the semicircular claw grooves 177 is better appreciated with reference to the embodiment of FIGS. 9–11.

Figure 10:
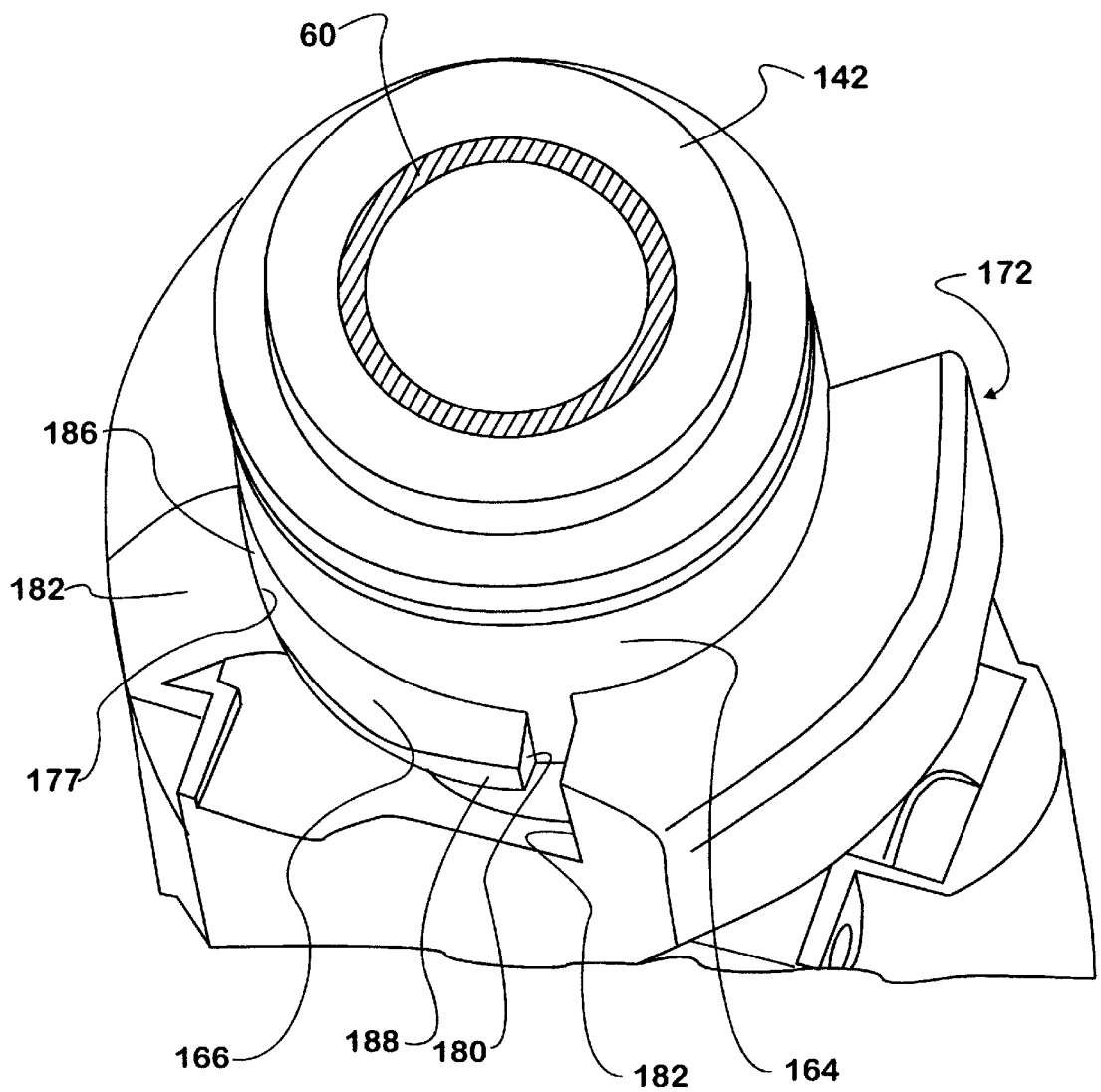
FIG. 10 is a perspective view of the mating portion of the connector assembly depicted in FIG. 9 adapted for mating with the receiver assembly.
Figure 11:
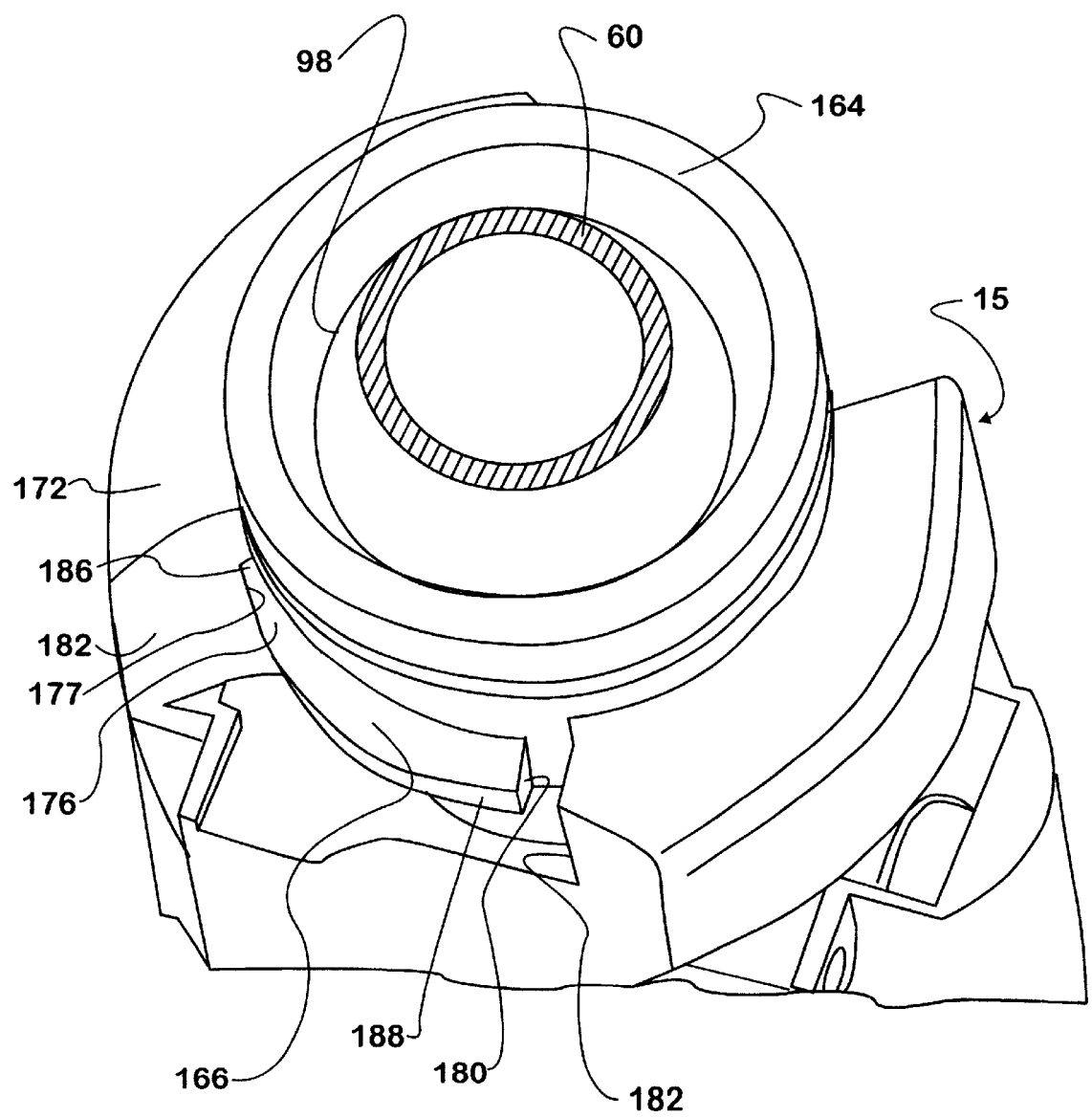
FIG. 11 is a perspective view as depicted in FIG. 10 with the ferrule removed.

Referring now to FIGS. 9–11, a further embodiment of the actuating fluid delivery system 10 is depicted. The figures depict the connector assembly 14 of the delivery system 10. It is understood that the connector assembly 14 is intended to be utilized in conjunction with a rail assembly 12 substantially as described with reference to FIG. 5. The receiver assembly 15 includes a claw lock connector extending downwardly therefrom that has certain features that are similar to the claw lock connector described in conjunction with FIG. 8. Instead of the snap ring 156 of FIG. 8, the embodiment of FIGS. 9–11 utilizes a lock nut 62 in threaded engagement with the receiver 15. The lock nut 62 bears down on a lower ferrule 142 (see FIG. 10) to force the lower ferrule 142 into a compressive sealing engagement with the lower spherical end 98 (see FIGS. 10 and 11). Tightening of the lock nut 62 onto the connector 164 causes rotation of the connector 164 as indicated by arrow A in FIG. 9a. Such rotation causes the helical claws 166 to engage the claw grooves 177 defined in the claw receiver 172.

As depicted in FIGS. 9a, 10, and 11, each of the pair of claws 166 may be a portion of a helix, having an entry end 186 that has a lesser radius than the trailing end 188. The entry end 186 has a slightly lesser radius than the radius of the claw groove 177 while the trailing end 188 has a slightly greater radius than the claw groove 177. Accordingly, continued clockwise rotation after the entry end 186 of the claw 166 enters the claw groove 177 acts to seat the claw 166 ever more tightly in the claw groove 177.

The rotation of the connector 164 caused by the rotative action of the lock nut 62 will continue until helical shaped claws 166 are wedged tightly within the claw groove 177. At this point, rotation of the connector 164 ceases and continued rotation of the lock nut 62 acts to further compress the lower ferrule 142. To disengage the lower collar 62 from the receiver assembly 15, opposite rotation to that of arrow A is imparted to the lock nut 62. Such rotation acts to withdraw the claws 166 from the respective claw grooves 177. Rotation of the lower connector 164 is arrested when the claw stop 180 of the respective claws 166 comes into contact with the stop base 182 of the receiver assembly 15. Continued counterclockwise rotation of the lock nut 62 acts to disengage the lock nut 62 from the lower connector 164.

The present invention may be embodied in other specific forms without departing from the spirit of the essential attributes of the invention. Therefore, the illustrated embodiments should be considered in all respects as illustrative and not restrictive, reference being made to the appended claims rather than to the foregoing description to indicate the scope of the invention.

What is claimed is:

1. A fluid delivery system for servicing a plurality of fuel injectors of an engine by delivering a supply of a fluid from a fluid source to each fuel injector of the plurality of fuel injectors, comprising:

rail means for conveying fluid, the rail means being positionable proximate the plurality of fuel injectors and having a fluid passageway defined therein, the fluid passageway being in fluid communication with the source of fluid; and connector means being in fluid communication with both the rail means and with a fuel injector of the plurality of fuel injectors for fluidly connecting the rail means to the fuel injector, the connector means being moveable in three planes to accommodate static tolerances existing between the rail means and the fuel injector and being moveable in three orthogonal axes during operation of the engine to accommodate dynamic relative motion between the rail means and the fuel injector, the connecting means having at least a first ball and a first socket forming a first coupling, the first ball being rotatably shiftable in the first socket, the shifting of the first ball providing for motion in the plane that is disposed in an orthogonal relationship to the first axis.

2. The fluid delivery system of claim 1 wherein the rail means comprises a rail assembly having an elongate rail and a plurality of intersecting sleeves, the fluid passageway being defined in the rail and an intersecting sleeve of the plurality of intersecting sleeves being associated with each fuel injector to be serviced, each first ball being rotatably disposed in a respective sleeve.

3. A fluid delivery system for servicing a plurality of fuel injectors by delivering a supply of a fluid from a fluid source to each fuel injector of the plurality of fuel injectors, comprising:

rail means for conveying fluid, the rail means being positionable proximate the plurality of fuel injectors and having a fluid passageway defined therein, the fluid passageway being in fluid communication with the source of fluid; and connector means being in fluid communication with both the rail means and with a fuel injector of the plurality of fuel injectors for fluidly connecting the rail means to the fuel injector, the connector means being moveable in three planes to accommodate static tolerances existing between the rail means and the fuel injector and being moveable in three orthogonal axes to accommodate dynamic relative motion between the rail means and the fuel injector, the rail means being a rail assembly having an elongate rail and a plurality of intersecting sleeves, the fluid passageway being defined in the rail and an intersecting sleeve of the plurality of intersecting sleeves being associated with each fuel injector to be serviced, each rail assembly sleeve having a fluid chamber defined therein, at least one bore being defined through a rail assembly sleeve wall, the bore effecting fluid communication between the fluid chamber and the rail fluid passageway.

4. The fluid delivery system of claim 2 wherein each rail assembly sleeve wall presents a substantially cylindrical inner surface, the substantially cylindrical inner surface defining in part the fluid chamber.

5. The fluid delivery system of claim 2 wherein each rail assembly sleeve is disposed in fluidly sealing engagement with at least one bore defined in the elongate rail.

6. The fluid delivery system of claim 2 wherein each rail assembly sleeve has a length dimension that is substantially the same as an outside diameter dimension of the elongate rail.

7. The fluid delivery system of claim 2 wherein each rail assembly sleeve is disposed in fluidly sealing engagement with two opposed bores defined in the elongate rail.

8. The fluid delivery system of claim 1 wherein the connecting means is translatable in a first axis with respect to the rail means and is shiftable in plane that is defined by a second and a third axis, the second and third axes being in an orthogonal relationship to each other and to the first axis.

9. The fluid delivery system of claim 8 wherein the first axis is substantially coincident with a rail assembly sleeve longitudinal axis.

10. The fluid delivery system of claim 1 wherein the connecting means has a second ball and a second socket forming a second coupling, the second ball being rotatably shiftable in the second socket, the shifting of the second ball providing for motion in the plane that is disposed in an orthogonal relationship to the first axis.

11. The fluid delivery system of claim 1 wherein the connecting means has a second ball and a second socket forming a second coupling, the first ball being rotatably shiftable in the first socket and the second ball being rotatably shiftable in the second socket, the shifting of the first ball and the shifting of the second ball providing for motion in the plane that is disposed in an orthogonal relationship to the first axis.

12. The fluid delivery system of claim 2 wherein the connecting means includes a first collar, the first collar being slidably, translatably disposable in the intersecting sleeve, a first socket being defined in the first collar and a first collar fluid passageway being defined in the first collar, the first collar fluid passageway being in fluid communication with the fluid passageway defined in the elongate rail of the rail assembly.

13. The fluid delivery system of claim 12 wherein the connecting means includes a tube, the tube being fluidly coupled to the first collar and having a tube fluid passageway defined therein, the tube fluid passageway being in fluid communication with the first collar fluid passageway.

14. The fluid delivery system of claim 13 wherein the connecting means tube includes a first ball, the first ball being sealably, rotatably disposed in the first socket defined in the first collar.

15. The fluid delivery system of claim 12 wherein the connecting means includes a second collar, the second collar being fluidly sealably coupleable to the fuel injector, a second socket being defined in the second collar and a second collar fluid passageway being defined in the second collar, the second collar fluid passageway being in fluid communication with the fuel injector.

16. The fluid delivery system of claim 15 wherein the connecting means tube includes a second ball, the second ball being sealably, rotatably disposed in the second socket defined in the second collar.

17. A connector for fluidly coupling a fluid conveying rail to a fuel injector coupled to an engine, the connector being translatable in a first longitudinal axis with respect to the rail and, having at least a first ball and a first socket forming a first coupling, the first ball being rotatably shiftable in the first socket during engine operation, the shifting of the first ball providing for motion in the plane that is disposed in an orthogonal relationship to the first axis.

18. The connector of claim 17 wherein the connector includes a first collar, the first collar being slidably, translatably disposable in the intersecting sleeve, the first socket being defined in the first collar and a first collar fluid passageway being defined in the first collar, the first collar fluid passageway being in fluid communication with the fluid passageway defined in the elongate rail of the rail assembly.

19. The connector of claim 18 wherein the connector has a second ball and a second socket forming a second coupling, the second ball being shiftable in the second socket, the shifting of the second ball providing for motion in the plane that is disposed in an orthogonal relationship to the first axis.

20. The connector of claim 19 wherein the connector includes a second collar, the second collar being fluidly sealably couplable to the fuel injector, the second socket being defined in the second collar and a second collar fluid passageway being defined in the second collar, the second collar fluid passageway being in fluid communication with the fuel injector.

21. The connector of claim 20 wherein the connector includes a tube, the tube being fluidly coupled to the first collar and fluidly coupled to the second collar and having a tube fluid passageway defined therein, the tube fluid passageway being in fluid communication with the first collar fluid passageway and with the second collar fluid passageway.

22. The connector of claim 21 wherein the first ball and second ball are disposed on the connector tube.

23. The connector of claim 22 wherein a one of the first and second balls is formed integral with the connector tube and the other of the first and second balls is disposed in a sliding engagement with the connector tube.

24. A fluid delivery system for servicing a plurality of fuel injectors by delivering a supply of a fluid from a fluid source to the plurality of fuel injectors, comprising:
 a rail assembly for conveying a fluid, the rail assembly being positionable proximate the plurality of fuel injectors and having a fluid passageway defined therein, the fluid passageway being in fluid communication with the source of fluid; and
 a connector assembly being in fluid communication with both the rail assembly and with a certain fuel injector of the plurality of fuel injectors for fluidly connecting the rail assembly to the fuel injector, the connector assembly being moveable in three orthogonally disposed axes for accommodating static tolerances existing between the rail assembly and the fuel injector and for accommodating dynamic relative motion between the rail assembly and the fuel injector and including a connecting assembly tube having a first ball being disposed external to the connecting assembly tube, the first ball being sealably, rotatably disposed in a first socket defined in a first collar.

25. The fluid delivery system of claim 24 wherein the rail assembly has an elongate rail and an intersecting sleeve associated with each fuel injector to be serviced, the fluid passageway being defined in the rail.

26. The fluid delivery system of claim 25 wherein each rail assembly sleeve has a fluid chamber defined therein, at least one bore being defined through a rail assembly sleeve wall, the bore extending from the fluid chamber to the fluid passageway.

27. The fluid delivery system of claim 24 wherein each rail assembly sleeve wall presents a substantially cylindrical inner surface, the substantially cylindrical inner surface defining in part the fluid chamber.

28. The fluid delivery system of claim 24 wherein each rail assembly sleeve is disposed in fluidly sealing engagement with at least one bore defined in the elongate rail.

29. The fluid delivery system of claim 24 wherein each rail assembly sleeve has a length dimension that is substantially the same as an outside diameter dimension of the elongate rail.

30. The fluid delivery system of claim 24, the first collar being slidably, translatably disposable in the intersecting sleeve, a first socket and a first collar fluid passageway being defined in the first collar, the first collar fluid passageway being in fluid communication with the fluid passageway defined in the elongate rail of the rail assembly.

31. The fluid delivery system of claim 30 wherein the connecting assembly includes a second collar, the second collar being fluidly sealably couplable to the fuel injector, a second socket and a second collar fluid passageway being defined in the second collar, the second collar fluid passageway being in fluid communication with the fuel injector.

32. The fluid delivery system of claim 31 wherein the connecting assembly tube is fluidly coupled to the first collar and fluidly coupled to the second collar and having a tube fluid passageway defined therein, the tube fluid passageway being in fluid communication with the first collar fluid passageway and with the second collar fluid passageway.

33. The fluid delivery system of claim 24 wherein the connecting assembly tube includes a second ball, the second ball being sealably, rotatably disposed in a second socket defined in a second collar.

34. The fluid delivery system of claim 33 wherein at least one of the first and second balls is formed integral with the connecting assembly tube.

35. A fluid delivery system for delivering a supply of a fluid from a fluid source to a plurality of fuel injectors, comprising:
 a common rail for conveying a fluid, the common rail being positionable proximate the plurality of fuel injectors, the common rail having a rail assembly, the rail assembly having an elongate rail and an intersecting sleeve associated with each of the fuel injectors of the plurality of fuel injectors, a fluid conveying connector being connectable to a respective fuel injector being disposed in each respective intersecting sleeve, a fluid passageway being defined in the rail, the fluid passageway being in fluid communication with the source of fluid.

36. The fluid delivery system of claim 35 wherein each rail assembly sleeve has a fluid chamber defined therein, at least one bore being defined through the rail assembly sleeve wall, the bore extending from the fluid chamber to the rail fluid passageway.

37. The fluid delivery system of claim 36 wherein each rail assembly sleeve wall presents a substantially cylindrical inner surface, the substantially cylindrical inner surface defining in part the fluid chamber.

38. The fluid delivery system of claim 37 wherein each rail assembly sleeve is disposed in fluidly sealing engagement with at least one bore defined in the elongate rail.

39. The fluid delivery system of claim 37 wherein each rail assembly sleeve is disposed in fluidly sealing engagement with two bores defined in the elongate rail.

40. The fluid delivery system of claim 35 wherein each rail assembly sleeve has a longitudinal axis that is disposed substantially orthogonal with respect to an elongate rail longitudinal axis.

41. The fluid delivery system of claim 35 wherein each rail assembly sleeve has a longitudinal axis that is substantially orthogonal with respect to an elongate rail longitudinal axis.

42. The fluid delivery system of claim 35 wherein each rail assembly sleeve has a length dimension that is substantially the same as an outside diameter dimension of the elongate rail.

43. The fluid delivery system of claim 35 wherein each rail assembly sleeve is disposed in fluidly sealing engagement with two opposed bores defined in the elongate rail.

44. A coupler for fluidly coupling a rail assembly including a fluid conveying connector to a fuel injector, the fuel injector having a fluid passageway defined therein, the injector fluid passageway being fluidly communicable with a rail fluid passageway defined in a generally tubular rail component, the coupler comprising:

a ferrule being annularly disposed with respect to the fluid conveying connector component and being disposable in an inner circumferential surface of a receiver component that is operably coupled to the fuel injector; and a lock nut being annularly disposed with respect to the fluid conveying connector component, the lock nut having a ferrule engaging surface disposed opposite a ferrule surface and having a first set of threads engageable with a second set of threads defined on the receiver component, whereby threadedly engaging the first and second set of threads acts to force the ferrule engaging surface into compressive engagement with the ferrule surface for compressing the ferrule in a space defined between the fluid conveying connector component and the inner circumferential surface of the receiver to form a substantially fluid-tight seal between the fluid conveying connector component and the fuel injector.

45. The coupler of claim 44 further including an O-ring seal disposed substantially opposing the ferrule surface, compressing the ferrule acting to compress the O-ring seal.

46. The coupler of claim 44 further including a receiver assembly fixedly, fluidly coupled to the fuel injector, the inner circumferential surface being defined in the receiver assembly and the second set of threads being formed on a receiver flange surface.

47. A connector of an actuating fluid delivery system, the connector for mating with a fuel injector, comprising:

a claw lock engagement device for effecting a sealing engagement with the fuel injector having at least two semi-circular claws, each claw defining a portion of a helix extending from an entry end to a trailing end, the entry end being of lesser radius than the trailing end.

48. The connector of claim 47 further including a receiver assembly, the receiver assembly being operably fluidly coupleable to the fuel injector to define a fluid interface between the connector and the fuel injector.

49. The connector of claim 48 wherein the receiver assembly includes a plurality of claw grooves defined therein, a certain claw groove being associated with each of the at least two semi-circular claws for rotational engagement therewith.

50. A connector of an actuating fluid delivery system, the connector for mating with a fuel injector, comprising: a lock nut, the lock nut being threadedly engageable with threads defined on a threaded connector surface, such threaded engagement acting to compress a sealing ferrule.

51. The connector of claim 50 further including an O-ring seal, the O-ring seal being compressible by the sealing ferrule to define a fluidly sealing engagement between an actuating fluid system conduit and the fuel injector.

52. The connector of claim 51 further including a snap ring, the snap ring being disposable in an annular groove defined in an actuating fluid delivery system surface, the snap ring acting to compress a second sealing ferrule.

53. The connector of claim 52 wherein the lock nut includes a standoff disposed opposite the snap ring, the standoff being positionable relative to the snap ring to radially compress the snap ring within a chamfered entry to the annular groove, the snap ring expanding into the annular groove after clearing the chamfered entry.

54. A method of conveying an actuating fluid from a fluid source to a plurality of fuel injectors having the steps of:

fluidly coupling an elongate rail having a fluid passage defined therein to the actuating fluid source;

fluidly coupling the rail to each of the plurality of fuel injectors by means of a connector that is in fluid communication with the rail and with a certain fuel injector of the plurality of fuel injectors; and minimizing the static and dynamic stresses on the fuel injector by providing for translatability of the connector in a first longitudinal axis and shiftability of the connector in a second axis and a third axis at least in part by means of a ball that is shiftable responsive to the imposition of the dynamic stresses, the second and third axes being disposed orthogonal to one another and orthogonal to the first axis.

55. The method of claim 54 further including the step of slidably joining a first connector member and a second connector member for providing the translatability in the first longitudinal axis.

56. The method of claim 54 further including the step of rotatably joining a first ball connector member to a first socket connector member for providing the shiftability in the second and third axes.

57. The method of claim 56 further including the step of rotatably joining a second ball connector member to a second socket connector member for providing the shiftability in the second and third axes.

58. The method of claim 54 further including the steps of transversely disposing a sleeve in the rail and defining a fluid passageway in the sleeve, the fluid passageway in the sleeve being in fluid communication with the rail fluid passageway.

59. The method of claim 58 further including the step of slidably sealingly disposing the connector in the sleeve.

60. A method of conveying an actuating fluid from an actuating fluid rail to a plurality of fuel injectors having the steps of:

fluidly coupling the rail to each of the plurality of fuel injectors by means of a connector that is in fluid communication with the rail and with a certain fuel injector of the plurality of fuel injectors; and minimizing the static and dynamic stresses on the fuel injector by providing for translatability of the connector in a first longitudinal axis and shiftability of the connector in a second axis and a third axis, the second and third axes being disposed orthogonal to one another and orthogonal to the first axis, the dynamic stress being minimized at least in part by a ball being shiftable responsive to the imposition of such stresses.

61. The method of claim 60 further including the step of slidably joining a first connector member and a second connector member for providing the translatability in the first longitudinal axis.

62. The method of claim 60 further including the step of rotatably joining a first ball connector member to a first socket connector member for providing the shiftability in the second and third axes.

63. The method of claim 62 further including the step of rotatably joining a second ball connector member to a second socket connector member for providing the shiftability in the second and third axes.

* * * * *

UNITED STATES PATENT AND TRADEMARK OFFICE
CERTIFICATE OF CORRECTION

PATENT NO. : 6,374,805 B1
DATED : April 23, 2002
INVENTOR(S) : Kenneth R. Seymour, Martin R. Zielke and Edgardo Y. Estacio It is certified that error appears in the above-identified patent and that said Letters Patent is hereby corrected as shown below:

<u>Title page,</u>
Item [75], please correct the following:
-- [75] Edgardo Y. Estacio, Itasca --

Signed and Sealed this

Twenty-fifth Day of June, 2002

*Attest:*

*Attesting Officer*

JAMES E. ROGAN
*Director of the United States Patent and Trademark Office*